United States Patent
Varpiola et al.

(10) Patent No.: US 11,943,369 B2
(45) Date of Patent: Mar. 26, 2024

(54) TECHNOLOGY VALIDATION AND OWNERSHIP

(71) Applicant: Synopsys, Inc., Mountain View, CA (US)

(72) Inventors: Mikko Einari Varpiola, Los Gatos, CA (US); Craig E. Shinners, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 733 days.

(21) Appl. No.: 16/324,422

(22) PCT Filed: Aug. 9, 2017

(86) PCT No.: PCT/US2017/046176
§ 371 (c)(1),
(2) Date: Feb. 8, 2019

(87) PCT Pub. No.: WO2018/031703
PCT Pub. Date: Feb. 15, 2018

(65) Prior Publication Data
US 2019/0182053 A1    Jun. 13, 2019

Related U.S. Application Data

(60) Provisional application No. 62/372,723, filed on Aug. 9, 2016.

(51) Int. Cl.
*G06F 21/16* (2013.01)
*G06Q 50/18* (2012.01)
(Continued)

(52) U.S. Cl.
CPC ............ *H04L 9/3247* (2013.01); *G06F 21/16* (2013.01); *G06Q 50/184* (2013.01);
(Continued)

(58) Field of Classification Search
CPC ............................ G06F 21/16; G06Q 2220/00
See application file for complete search history.

(56) References Cited

U.S. PATENT DOCUMENTS 7,536,377 B1 *  5/2009  Milne ................... G06F 16/164
                                                711/170
8,498,982 B1 *  7/2013  Cope .................... G06F 16/2457
                                                707/722

(Continued)

OTHER PUBLICATIONS

Kim et al. A Birthmark-based Method for Intellectual Software Asset Management Jan. 9-11, 2014 IMCOM (ICUIMC)'14 (Year: 2014).*

(Continued)

*Primary Examiner* — David J Pearson
(74) *Attorney, Agent, or Firm* — Lowenstein Sandler LLP

(57) ABSTRACT

A method comprising receiving a plurality of signatures representing one or more proprietary files from a vendor generated without disclosure of the proprietary files, each signature corresponding to a segment of a proprietary file. The method further comprising and validating each of the plurality of the signatures, to ensure that the signatures are the proprietary code of the vendor. The method further comprises adding the plurality of the signatures to a global database, the global database used to compare the proprietary data of the vendor to other technology data and taking various action based on the results of the comparison.

20 Claims, 18 Drawing Sheets

(51) Int. Cl.
*H04L 9/08* (2006.01)
*H04L 9/32* (2006.01)
*H04L 9/00* (2022.01)

(52) U.S. Cl.
CPC .......... *H04L 9/0861* (2013.01); *H04L 9/3236* (2013.01); *H04L 9/3239* (2013.01); *G06Q 2220/00* (2013.01); *H04L 9/50* (2022.05)

(56) References Cited

U.S. PATENT DOCUMENTS

| | | | |
|---|---|---|---|
| 9,092,586 B1* | 7/2015 | Ginetti | G06F 30/30 |
| 9,471,285 B1* | 10/2016 | Koohgoli | G06F 8/71 |
| 2003/0217275 A1* | 11/2003 | Bentley | G06F 21/6209 |
| | | | 713/184 |
| 2007/0043956 A1 | 2/2007 | El Far et al. | |
| 2007/0294179 A1 | 12/2007 | Krawetz | |
| 2007/0294544 A1* | 12/2007 | Ishikawa | G06F 21/10 |
| | | | 713/193 |
| 2009/0281995 A1* | 11/2009 | Mousavi | G06F 16/951 |
| 2010/0180349 A1* | 7/2010 | Koohgoli | G06F 21/10 |
| | | | 726/30 |
| 2010/0242028 A1* | 9/2010 | Weigert | G06F 21/105 |
| | | | 717/131 |
| 2010/0257494 A1* | 10/2010 | Pouarz | G06F 30/3323 |
| | | | 716/111 |
| 2012/0011218 A1 | 1/2012 | Isaacs | |
| 2012/0130980 A1* | 5/2012 | Wong | G06F 21/16 |
| | | | 707/E17.108 |
| 2015/0109639 A1 | 4/2015 | Ishibashi | |
| 2015/0294094 A1* | 10/2015 | Hefeeda | G06F 21/105 |
| | | | 726/32 |
| 2016/0164884 A1 | 6/2016 | Sriram et al. | |
| 2019/0280856 A1* | 9/2019 | Yeap | G06Q 50/184 |

OTHER PUBLICATIONS

PCT International Search Report and Written Opinion for International Application No. PCT/US2017/046176, dated Nov. 9, 2017, 8 pages.

\* cited by examiner

TECHNOLOGY VALIDATION AND OWNERSHIP

FIELD

The present application relates to validation, and more particularly to protecting ownership of software source code and hardware design.

BACKGROUND

Today, most software products are assembled from components in much the same way that physical products are assembled from parts. Software components help get a product to market faster, and often result in cost savings because a functionality does not need to be developed from scratch. Whether the product is a mobile application, a medical device, an industrial controller, SoC, or firmware used in an airplane, it is created in part by assembling software components.

First party proprietary code is a software component that developed by a product team in an organization. This code is usually what makes magic happen, and contains various levels of proprietary, often classified intellectual property. First party code is what, in part, differentiates products from competitors and makes them unique. Sometimes, the builder of the product may choose to license this code for a fee to others, or offer it for free under various open source licensing models. First party code also ties together third party code and other components used by the product. Third party code components are often open source components, but can also be commercial. For example, a product team might use open source component for securing network communication. They could use a purchased commercial library for generating reports. And they might use an internally-developed component maintained by another team containing proprietary IP for video encoding and decoding.

Similarly, hardware devices are often designed using combination of proprietary hardware components (e.g., electrical circuits that perform a certain function) combined with third party or open source hardware components. Prior to instantiation into a physical device, the hardware components are designed using hardware description language (HDL) code. Collectively, the combination of software and hardware components or code to create a product can have great commercial value. These software and hardware components are typically treated as valuable intellectual property assets of the builder.

Leakage of a company's intellectual property assets such as source code and/or HDL code to the public domain, or to a competitor can have dramatic negative consequences. This may be a result of any number of events including, but not limited to a deliberate industrial espionage, hackers penetrating company and posting all or some of the IP to public domain, ex-employee stealing company's source code and using that at his new employer with or without new employers knowledge, or a result of a careless commit that accidentally makes IP available to unlicensed entities, or exposes it to the public. Similarly, uncontrolled introduction of IP under incompatible licenses to a proprietary code bases has potential to lead into unbounded damages, or a need to, by way of example, open source the affected IP blocks.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

An automated solution that enables the creation of one-way signatures of proprietary technology data, such as software code (which may be either in source code or object code format) or hardware code, such as HDL code or code in another hardware descriptive language or format, and record them into a Global signature database. In one embodiment, prior to recording signatures, they are validated for uniqueness and origin. In one embodiment, once signatures are in the Global signature database, a builder, perhaps more commonly referred to as a vendor, may receive alerts if their data is seen in the public domain or outside the organization. In one embodiment, the system may be used to alert vendor A that IP belonging to someone else is being introduced to their proprietary code base or IP. In one embodiment, the system may be used to track where the proprietary IP is being detected. In one embodiment, the system also ensures that the components used in the proprietary IP are of high quality and can be legally used, without risk of contaminating the proprietary code bases with incompatible or 'toxic' free or open source software (FOSS) or commercial licenses or potentially illegally obtained commercial IP. In one embodiment, the system allows effectively protection of vendor proprietary technology data, managing the risk of using 3rd party code, and alerting if IP theft or leakage is detected. In situations where ownership is contested, it can provide a proof of existence and ownership at given point in time. In one embodiment, the Global signature database may be a distributed database, and the system may use public blockchains as ledgers to record signatures in a decentralized, difficult to forge manner.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
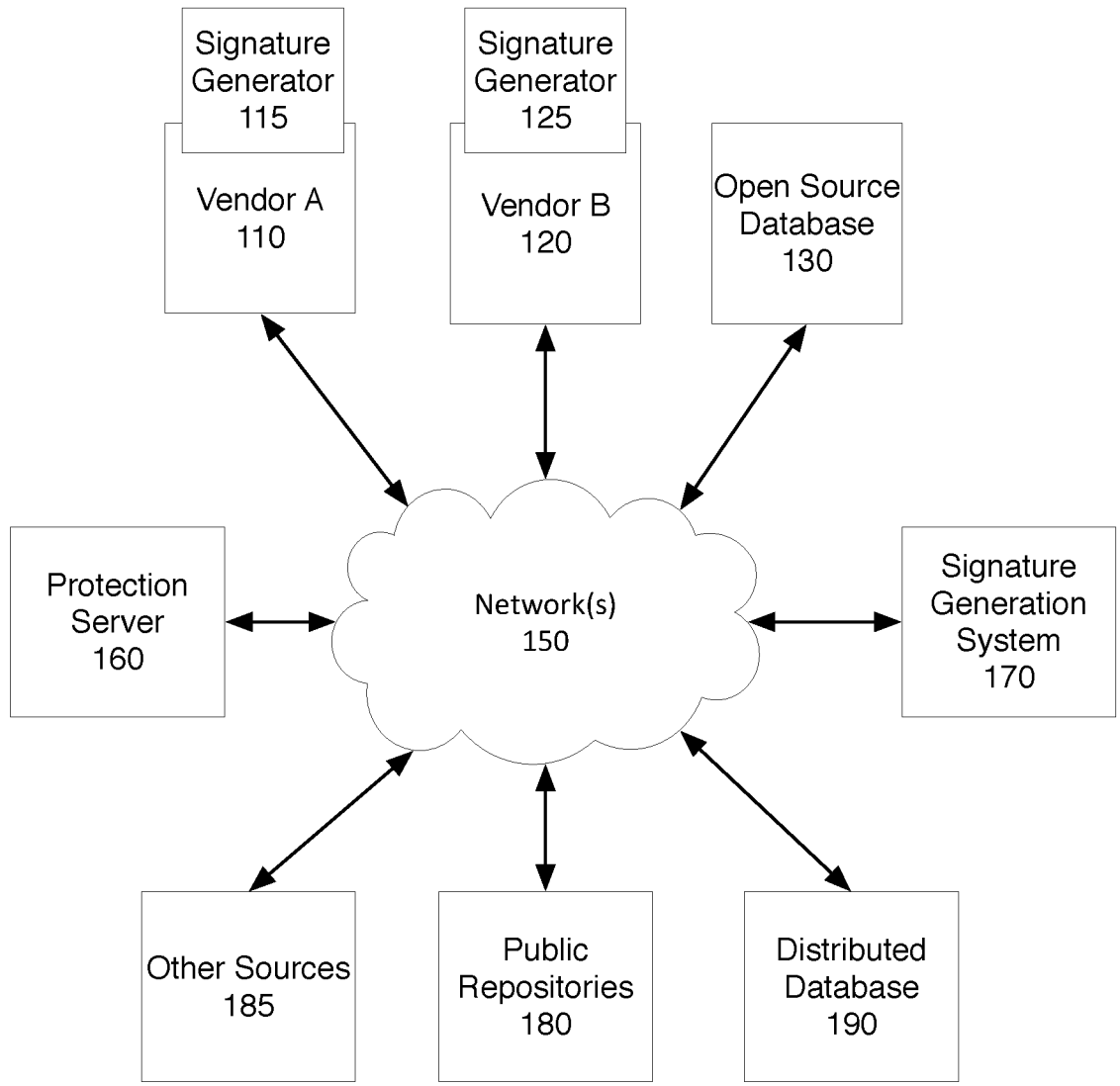
FIG. 1 is a network diagram showing one embodiment of a technology and ownership validation system, at a high level.

FIG. 1 is a network diagram showing one embodiment of technology and ownership validation system, at a high level. The system includes a plurality of vendors 110, 120, with proprietary files. The proprietary files may be software code, hardware description language (HDL), IP blocks in various languages, or other proprietary files representing code for software, hardware, or a combination. Note that the proprietary files may include FPGA code, and other descriptors.

The protection server 160 is designed to create a system in which vendors can, in some embodiments, track their own proprietary files securely without disclosing them to any third party, as well as verify that their files are not leaking (being released as open source), and they are not bringing on-board the proprietary files or others, or open source code, without awareness. The protection server 160 in one embodiment makes local signature generators 115, 125 available to vendors. The vendors 110, 120 can use the signature generators to generate unique, trackable, unforgeable, and non-reverse-engineerable signatures for their proprietary files.

Those signatures are then shared with protection server 160. In one embodiment, the signature may be made available via a distributed database 190. The distributed database 190, in one embodiment, stores blockchain signed versions of signatures, in one embodiment generated by signature generation system 170.

In one embodiment, in addition to the proprietary files of vendors 110, 120, the system may also obtain files from one or more open source databases 130 and repositories 180 and other sources 185. Other sources 185 may include drop file sources, such as paste.bin, wikileaks, and other drop sites. The signature generation system 170 may process these files to generate the unique signatures for open source files. This enables the IP protection server 160 to perform comparisons not only between the files of different vendors, but also the files of vendors and open source files.

The protection server 160 performs comparisons, and provides alerts to vendors, as will be described below. In one embodiment, the IP protection server 160 also provides validation of ownership, and chain of use.

Figure 2A:
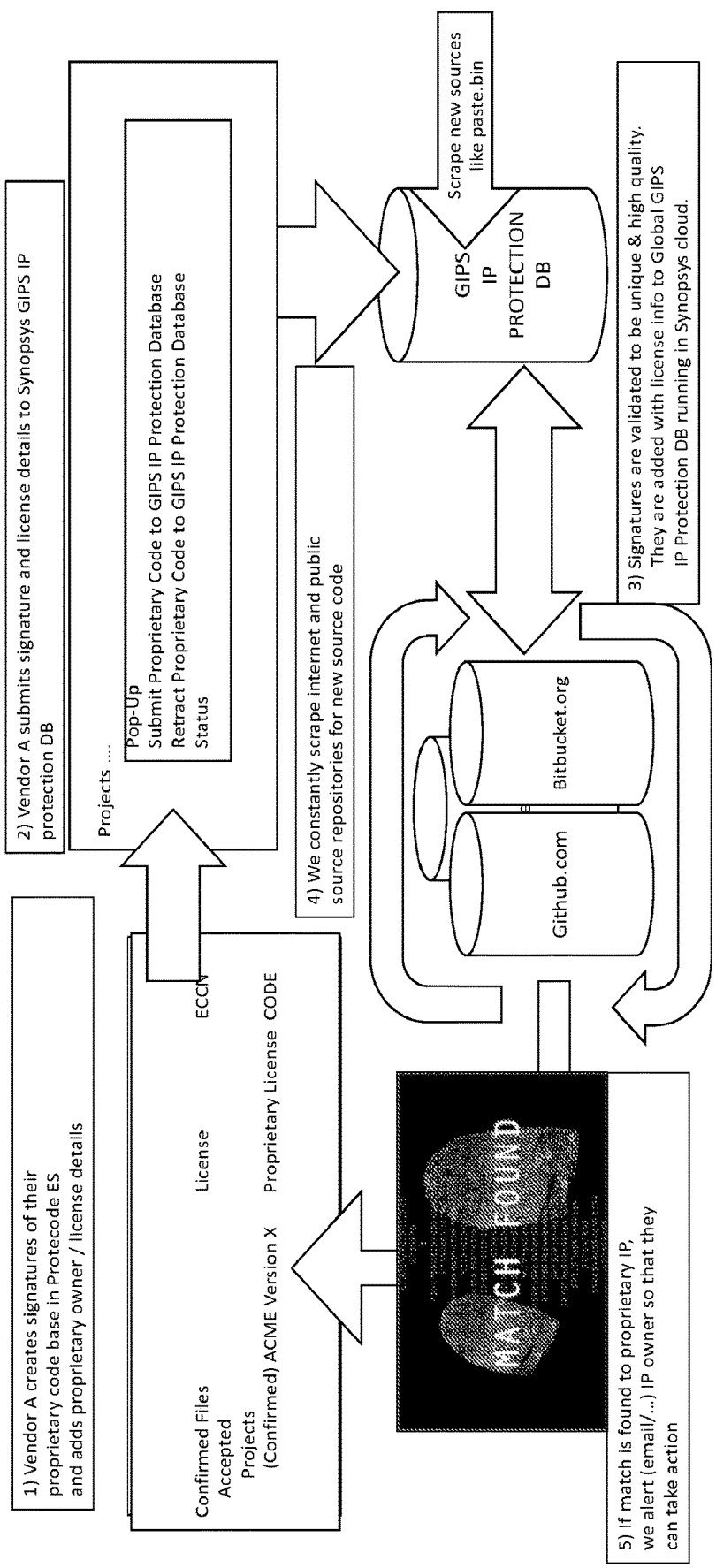
FIGS. 2A-2F are diagrams illustrating various use cases for the system.

FIGS. 2A-2F are diagrams illustrating various use cases for the system. FIG. 2A illustrates an exemplary use case. In this scenario, a vendor creates a signature of all or a portion of their proprietary files, or code base. In one embodiment, metadata is added. Metadata may include the vendor identity, copyright date, license data, and other relevant information. Other relevant information may include supported chipsets/devices, compilation targets, memory requirements, associated other files, etc. In one embodiment, each signature is of a segment of a file. In one embodiment, the metadata associated with one segment indicates the other signature segments associated in a particular complete file.

The signatures are processed at the vendor site, enabling the system to be used without providing copies of files which are proprietary to the system. The signatures are then submitted to the signature database. In one embodiment, the proprietary files may be sent to another system, to enable processing of the files off-premise. In one embodiment, the database may be a database maintained by the IP protection sever. In one embodiment, the database may be a publicly available distributed database.

The system validates the signatures are validated to be unique and high quality. The validated signatures are then added into the database.

Open source data is obtained from various publicly available databases and sources, such as GitHub, SourceForge, Bitbucket, paste.bin, Wikileaks, and others. The files from these open source repositories are processed to generate signatures as well.

The system then monitors the proprietary code, to ensure that no open source file signatures are found in the proprietary data, indicating that open source information has been entered into the vendor's proprietary files or that the vendor's proprietary data/IP exists in some public database. If such a match is found, the vendor may be alerted, to enable them to take action.

Figure 2B:
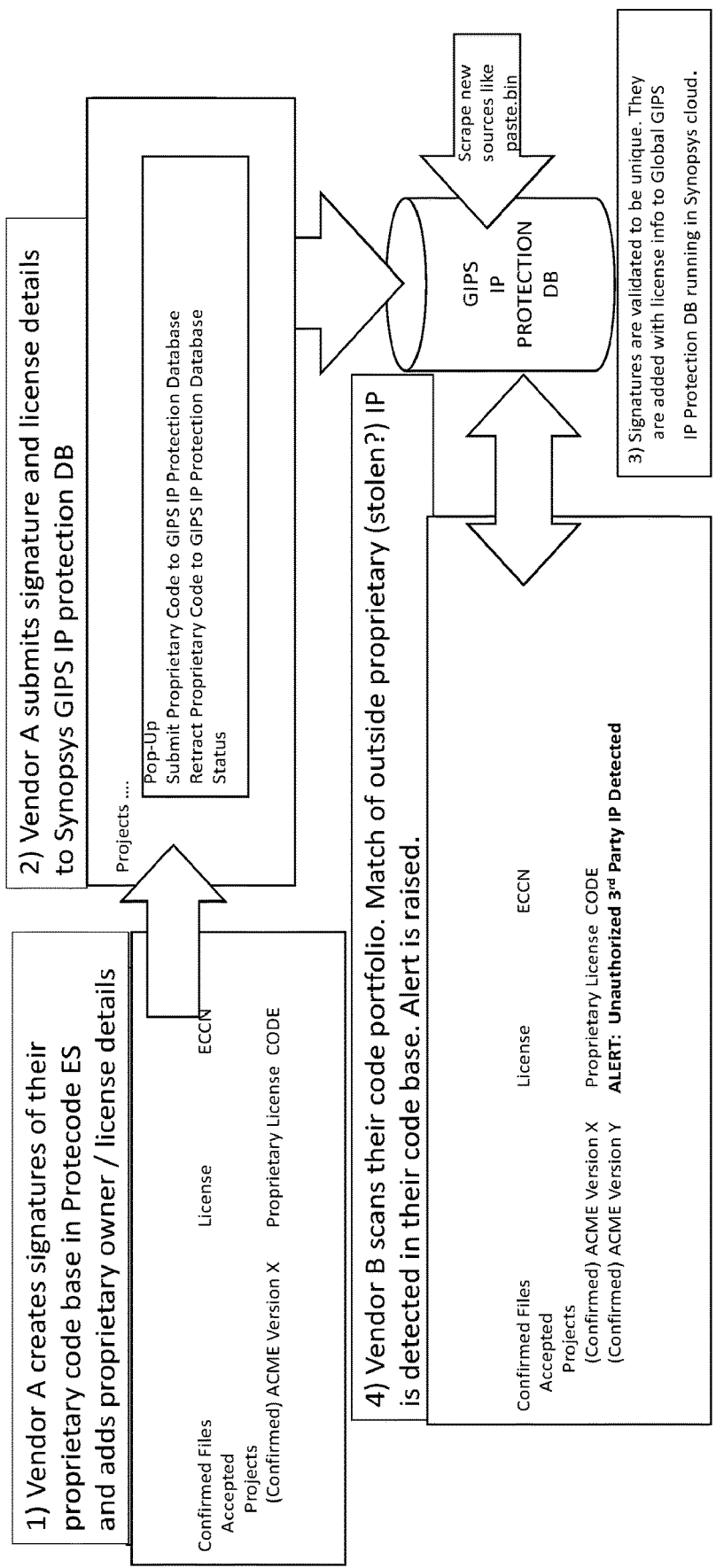

FIG. 2B illustrates one embodiment of another use case. In this use case, the signatures are matched against signatures from another vendor. When a match is found, an alert is sent to the vendor whose files are contaminated.

Figure 2C:
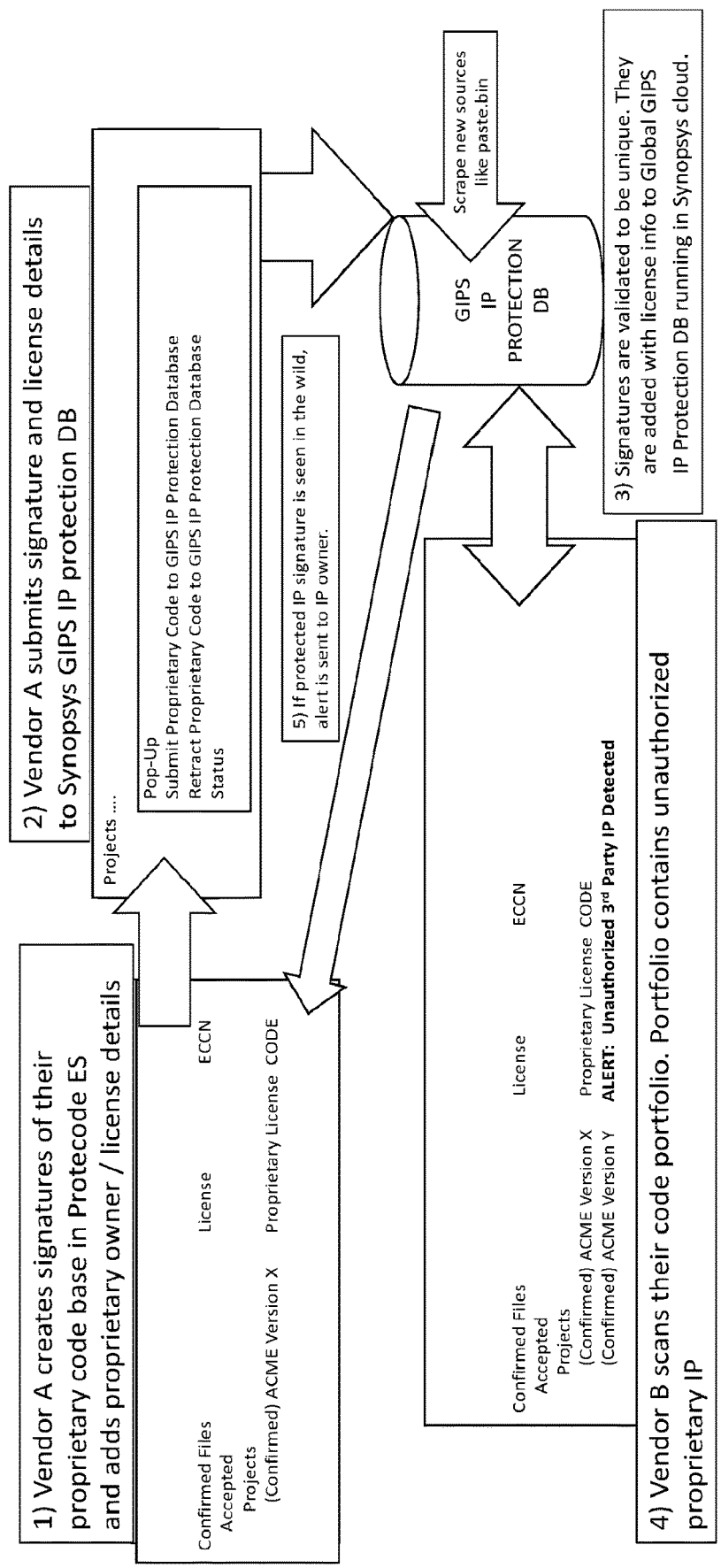

FIG. 2C illustrates another example use case, in which when a match is found between the files of two vendors, the alert is sent to the vendor whose files are leaked/misappropriated.

Figure 2D:
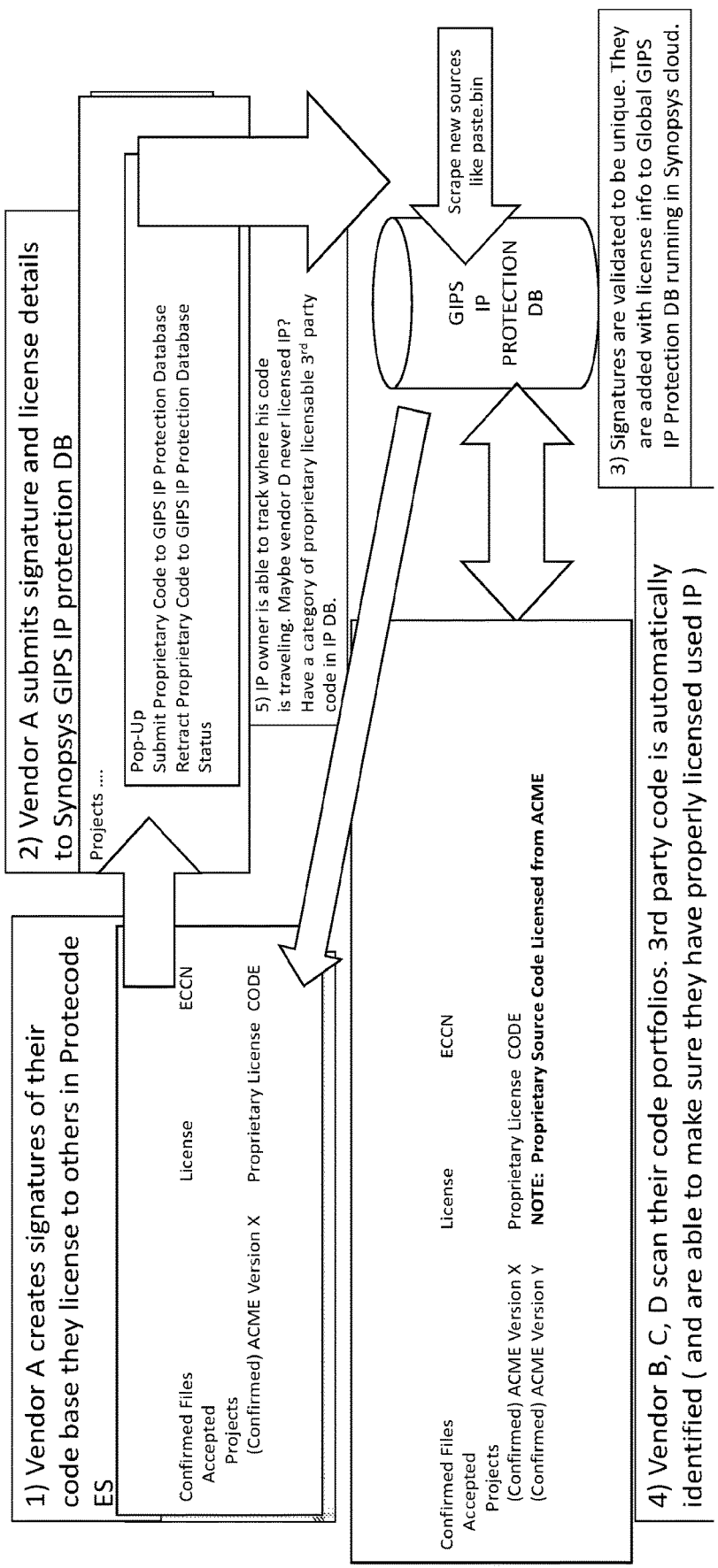

FIG. 2D illustrates another example use case in which a vendor creates signatures of licensed files, with metadata. The metadata may identify the type of licenses provided, and other relevant data. When the data of other vendors, and optionally open source files, are scanned, the use of the licensed code is identified. Furthermore, it enables identification of the code that is not properly licensed.

Figure 2E:
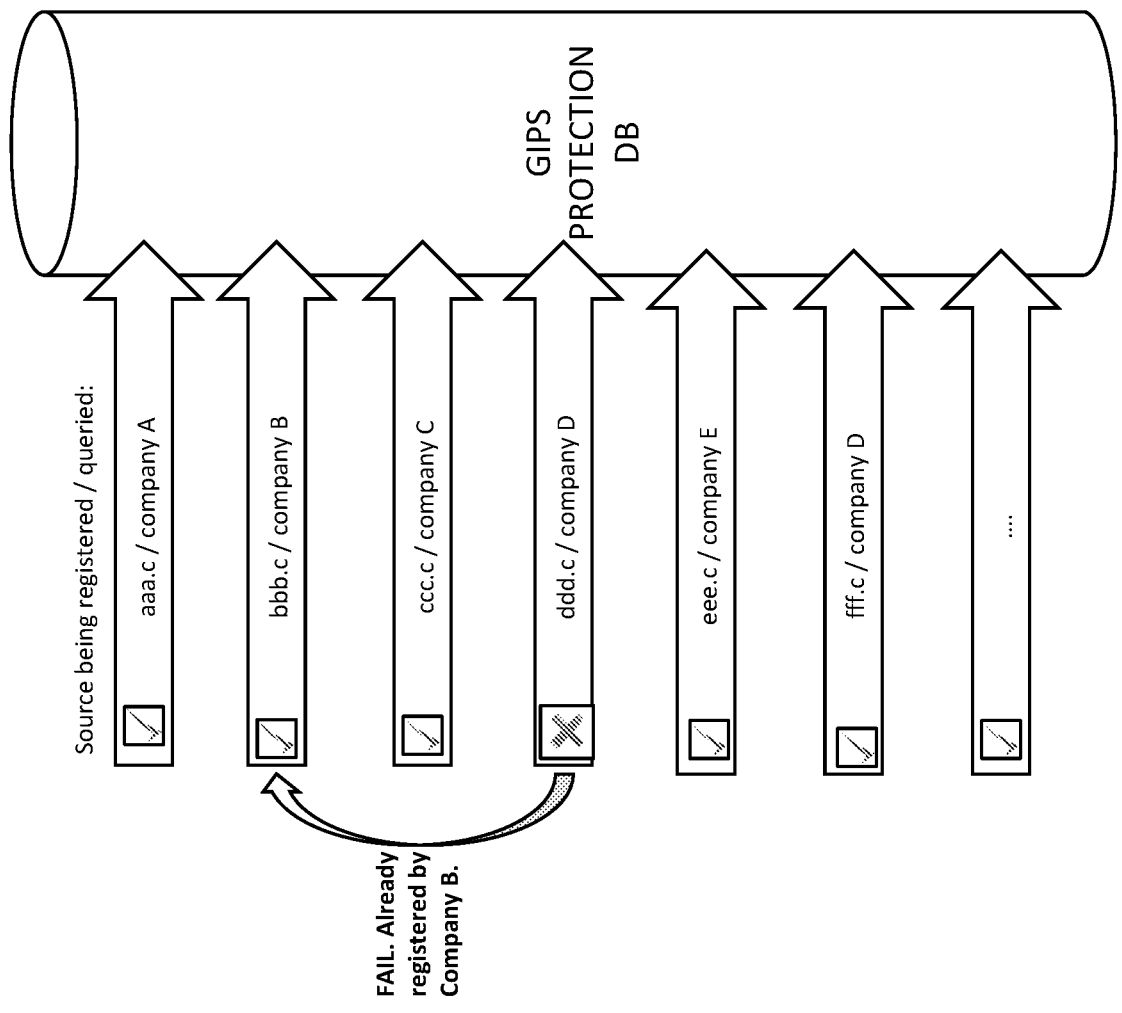

FIG. 2E illustrates another example use case, in which proof of authorship, ownership, and existence is incorporated into the GIPS protection database. This enables the system to become a central registrar for authenticity of source code, based on proprietary data. This may be provided as an effective proof, without storing the actual source code. In one embodiment, the system also permits owner of the IP to register multiple different versions of software, with similar, overlapping signatures for some parts of the IP. In one embodiment, the system also permits moving of a portfolio between companies, due to mergers & acquisitions (M&A), technology transfers, etc. In one embodiment, if such a transfer occurs, the system may also provide a complete audit trail of such transactions.

Figure 2F:
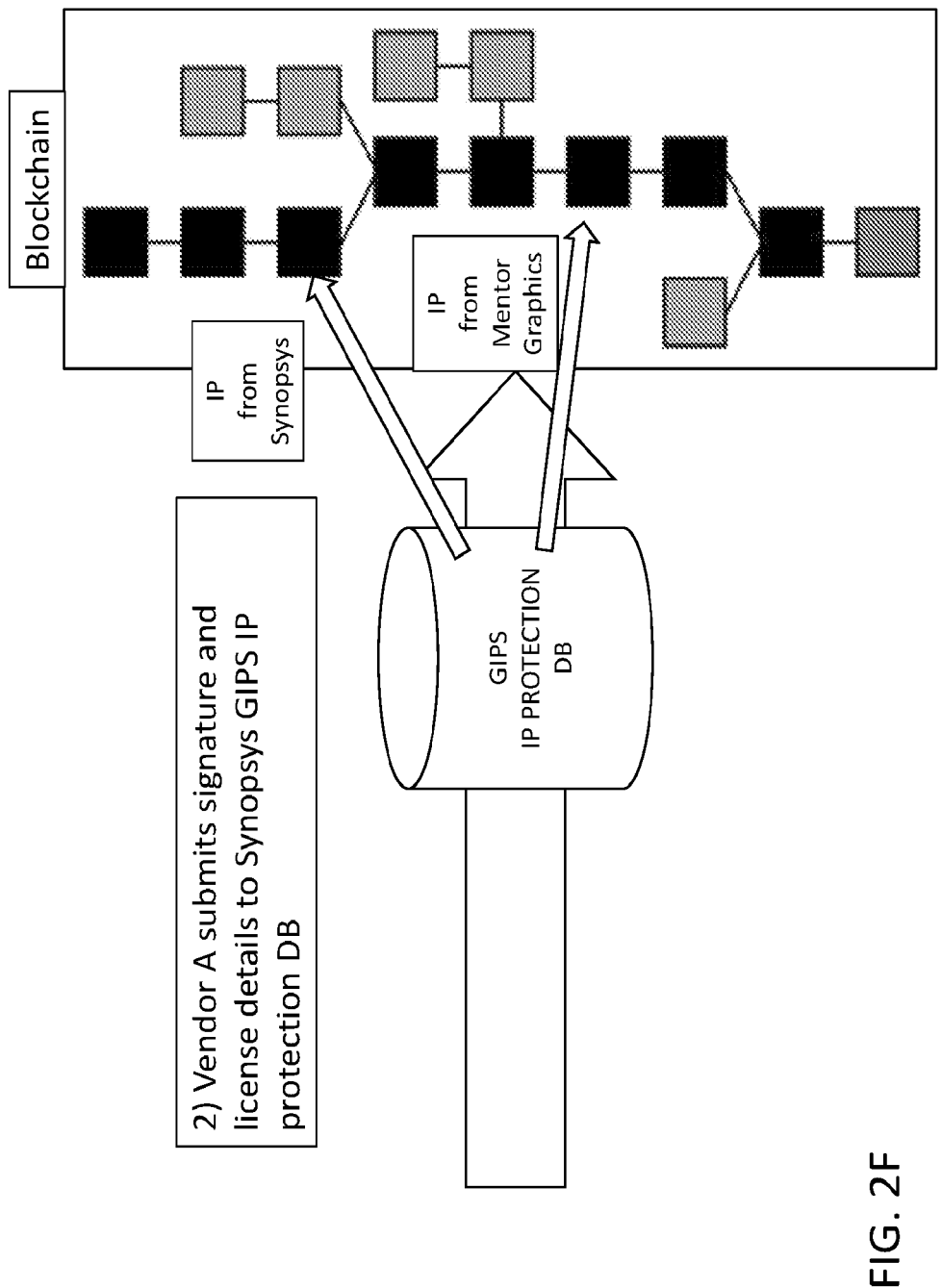

FIG. 2F illustrates an example use case, in which the signature data is stored in the form of blockchains. Blockchain represents a public ledger, which is used in one embodiment to provide a one-way unforgeable signature of the files. The format of the blockchain selected may be bitcoin, or some other active Blockchain (Ethereum, Litecoin, Doge, NXT, etc.) This enables the system to push verified, unchallenged signatures to a public blockchain, which is made freely available. This may be used to establish proof of Existence, Establish proof of 'first' creation, Establish proof of 'prior art'. In one embodiment an 'open' signature algorithm is used. In one embodiment, the signature algorithm, instead of hash, supports partial matching. The signature algorithm is robust against code alterations, and thus supports matching partial code snippets, and simple modifications such as renaming functions and variables, or removing comments does not impact the match. This enables the system to match code snippets, such as a function that has been copied vs. the entire the source file.

Figure 3:
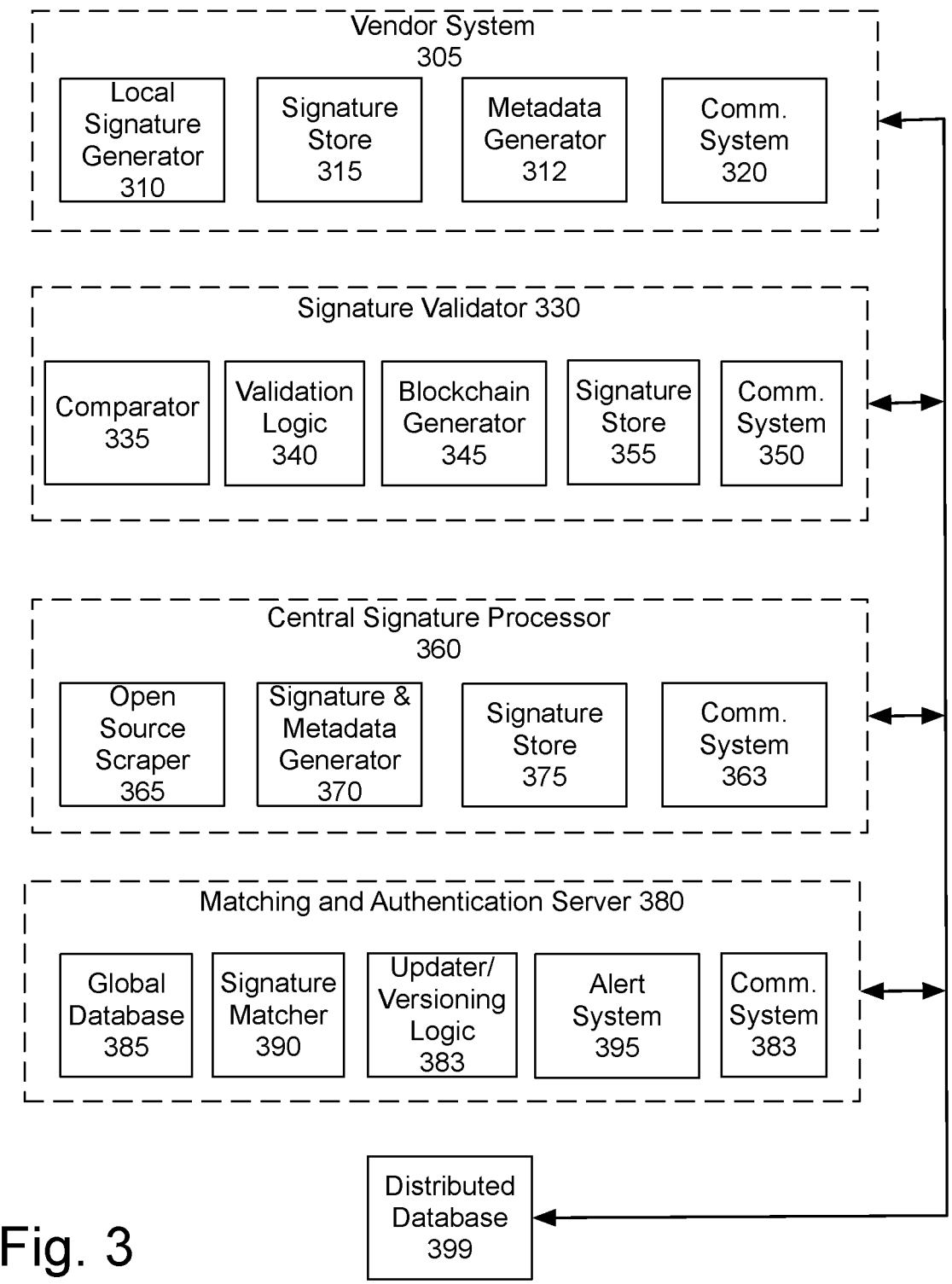
FIG. 3 is a block diagram of one embodiment of the system.

FIG. 3 is a block diagram of one embodiment of the system. In one embodiment, the system includes a vendor system 305, central signature processor 360, a signature validator 330, and a matching and authentication server 380. Although shown separately, the signature validator 330, central signature processor 360, and matching and authentication server 380 may be parts of the same system, located on the same server, or located on a distributed system which works together.

The vendor system 305 in on embodiment, is a downloadable tool, which is made available to a vendor. In one embodiment, the vendor system 305 enables a vendor to process their proprietary files locally, without providing them to the system. This enables the vendor to maintain trade secrets, and not reveal the exact details of their files. The vendor system 305 includes local signature generator 310, and signature store 315. In one embodiment, the signatures have associated metadata. The metadata may include the vendor's identification, licensing information, file associations, and other relevant data. The signatures and associated metadata generated are stored in signature store 315, and in one embodiment communicated via communication system 320 to the signature validator 330. Communications system 320, in one embodiment, comprises a network connection, or secure upload mechanism or cloud storage mechanism, or another way of providing the signatures to the IP protection server. In one embodiment, the vendor may choose send some or all of their proprietary files to the central signature processor 360, which can generate signatures, instead of generating them on-site.

Center signature processor 360, in one embodiment, processes open source files, and optionally files provided by vendors who want off-site signature generation. The open source scraper 365 obtains open source files from repositories such as GitHub and SourceForge, as well as site that provide a way to download files, such as Wikileaks, Tor, and Pastebin, or other known sources of open source files.

Signature & metadata generator 370 generates the signatures and metadata for open source files. For files obtained from vendors, the vendor provides the metadata for inclusion. The metadata for open source files in one embodiment includes source (e.g. Github), file associations, license, creation date, version, and other relevant information.

Signature store 375 temporarily stores the generated signatures, while communications system 363 provides the files to the signature validator 330.

Signature validator 330 includes comparator 335 to compare the signatures from vendor system 305, and central signature processor 360, which are stored in its storage 355. If a conflict is identified, validator 340 attempts to resolve the conflict, and if there is insufficient information, alerts the vendor. In one embodiment, signature validator 330 is used to ensure that signatures are unique, and that multiple copies of the same file are not claimed by different originators.

In one embodiment, signature validator 330 includes a block chain generator 345. Blockchain generation creates a unique validation key for each signature, in on embodiment, once the signatures are validated as being unique. Using blockchain enables the use of a distributed database 399, which can serve as an escrow and validation, as will be described below. The signature data is sent, via communication system 350 to matching and authentication server 380, and distributed database 399.

Matching and authentication server 380 in one embodiment maintains a global database 385 of signatures. Since the signatures are validated by validator 330, each signature in the database is unique 385. The signatures also include metadata, providing information about the file(s) associated with the signature.

In one embodiment, the matching and authentication server 380 includes a signature matcher 390, which enables matching of signatures in the database, whether proprietary or open source to identify leakage/misappropriation (when proprietary files of one vendor appear in the files of an open source project or another vendor) and contamination (when open source files, or files of another vendor appear in the files of a vendor). Alert system 395 sends out alerts, via communication system 383, to the appropriate vendor(s). In one embodiment, a vendor is informed of leakage/misappropriation or contamination, to enable them to take action.

Updater/versioning logic enables the system to update signatures when new versions of products or files are released. In one embodiment, the system does not re-generate all signatures, but only tracks alterations, and provides versioning and changes in ownership or licensing. In one embodiment, the blockchain generator 345 is used to update the blockchain to reflect such changes. In another embodiment, a new blockchain transaction may be generated when such changes are made.

Each of the systems and logics described herein run on a computer system or processor, and are algorithmic implementations to solve the technological problem presented by validating the authenticity and uniqueness of code. In one embodiment, the algorithms are implemented in software, such as C/C++, Go, Java, and Python. This problem, and thus this solution, is inherently linked to computing technology, since this problem only occurs because computer software and hardware IP have issues of leakage and contamination.

In one embodiment, signature generators 115, 125 are embedded in one or more electronic design automation (EDA) tools and automatically generate signatures each time the tool is invoked by the vendor throughout the EDA flow. An EDA flow can include multiple steps, and each step can involve using one or more EDA software tools. Some EDA steps and software tools are described below, with respect to FIG. 13. These examples of EDA steps and software tools are for illustrative purposes only and are not intended to limit the embodiments to the forms disclosed.

To illustrate the EDA flow, consider an EDA system that receives one or more high level behavioral descriptions of an IC device (e.g., in HDL languages like VHDL, Verilog, etc.) and translates ("synthesizes") this high level design language description into netlists of various levels of abstraction. A netlist describes the IC design and is composed of nodes (functional elements) and edges, e.g., connections between nodes. At a higher level of abstraction, a generic netlist is typically produced based on technology independent primitives.

The generic netlist can be translated into a lower level technology-specific netlist based on a technology-specific (characterized) cell library that has gate-specific models for each cell (functional element). The models define performance parameters for the cells; e.g., parameters related to the operational behavior of the cells, such as power consumption, delay, transition time, and noise. The netlist and cell library are typically stored in computer readable media within the EDA system and are processed and verified using many well-known techniques.

Figure 13:
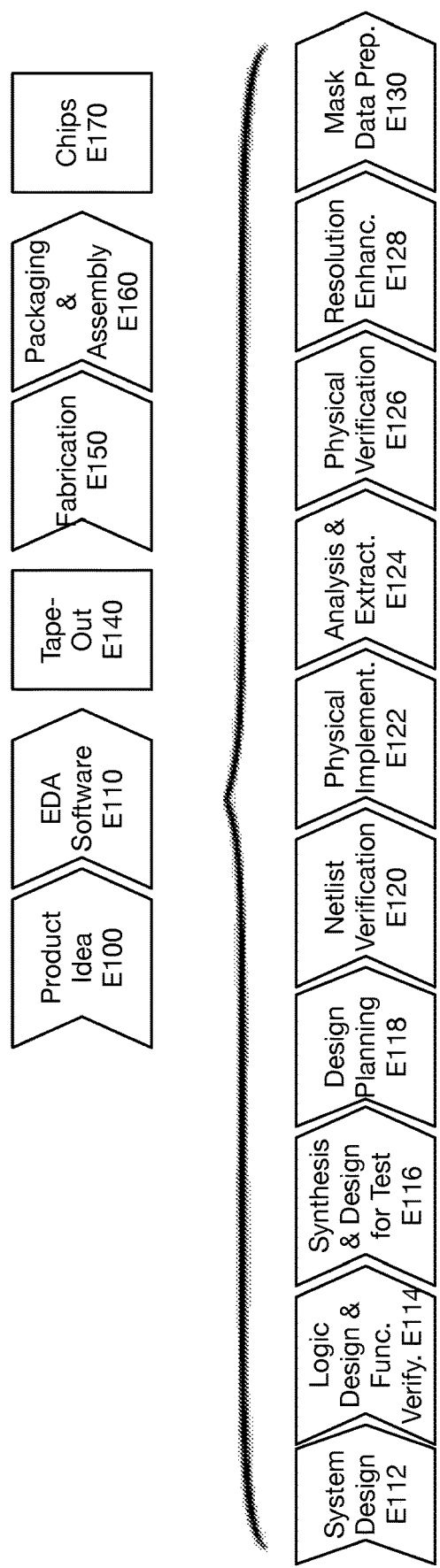
FIG. 13 shows a simplified representation of one embodiment of an electronic design automation (EDA) design flow.

Before proceeding further with the description, it may be helpful to place these processes in context. FIG. 13 shows a simplified representation of an exemplary digital ASIC design flow. At a high level, the process starts with the product idea (step E100) and is realized in an EDA software design process (step E110). When the design is finalized, it can be taped-out (event E140). After tape out, the fabrication process (step E150) and packaging and assembly processes (step E160) occur resulting, ultimately, in finished chips (result E170).

The EDA software design process (step E110) is actually composed of a number of steps E112-E130, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step E110) will now be provided:

System design (step E112): The designers describe the functionality that they want to implement and can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step E114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step E116): Here, the VHDL/Verilog is translated into a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and DesignWare® products.

Design planning (step E118): Here, an overall floorplan for the chip is constructed and analyzed for timing and top-level routing. Exemplary EDA software products from Synopsys, Inc. that can be used at this step include Jupiter and Floorplan Compiler products.

Netlist verification (step E120): At this step, the netlist is checked for compliance with timing constraints and for correspondence with the VHDL/Verilog source code. Exemplary EDA software products from Synopsys, Inc. that can be used at this step include VCS, VERA, Formality and PrimeTime products.

Physical implementation (step E122): The placement (positioning of circuit elements) and routing (connection of the same) occurs at this step. Exemplary EDA software products from Synopsys, Inc. that can be used at this step include the Astro product.

Analysis and extraction (step E124): At this step, the circuit function is verified at a transistor level, this in turn permits what-if refinement. Exemplary EDA software products from Synopsys, Inc. that can be used at this step include Star RC/XT, Raphael, and Aurora products.

Physical verification (step E126): At this step various checking functions are performed to ensure correctness for: manufacturing, electrical issues, lithographic issues, and circuitry. Exemplary EDA software products, Inc. that can be used at this step include the Hercules product.

Resolution enhancement (step E128): This step involves geometric manipulations of the layout to improve manufacturability of the design. Exemplary EDA software products from Synopsys, Inc. that can be used at this step include iN-Phase, Proteus, and AFGen products.

Mask data preparation (step E130): This step provides the "tape-out" data for production of masks for lithographic use to produce finished chips. Exemplary EDA software products from Synopsys, Inc. that can be used at this step include the CATS(R) family of products.

With embedded signature generators 115, 125, each of the above described EDA tools can generate and transmit unique signatures upon completion of each portion of the EDA flow. Thus a signature can be generated at the HDL stage, the netlist stage or after completion of place and route. Similarly, the software design flow can include various tools each of which can include signature generators 115, 125. By way of example, the Synopsys Software Security includes various tools such as the Synopsys' state-of-the-art static application security testing (SAST) product, Coverity. The Coverity tool can generate signatures on code following the completion of a static check prior to checking new code into a build. For the present application, regardless of which version of the design is used, the application will reference "language" and "code" and "code segment," for simplicity. However, it should be understood that these terms are meant to encompass the various versions of the EDA generated elements.

Figure 4:
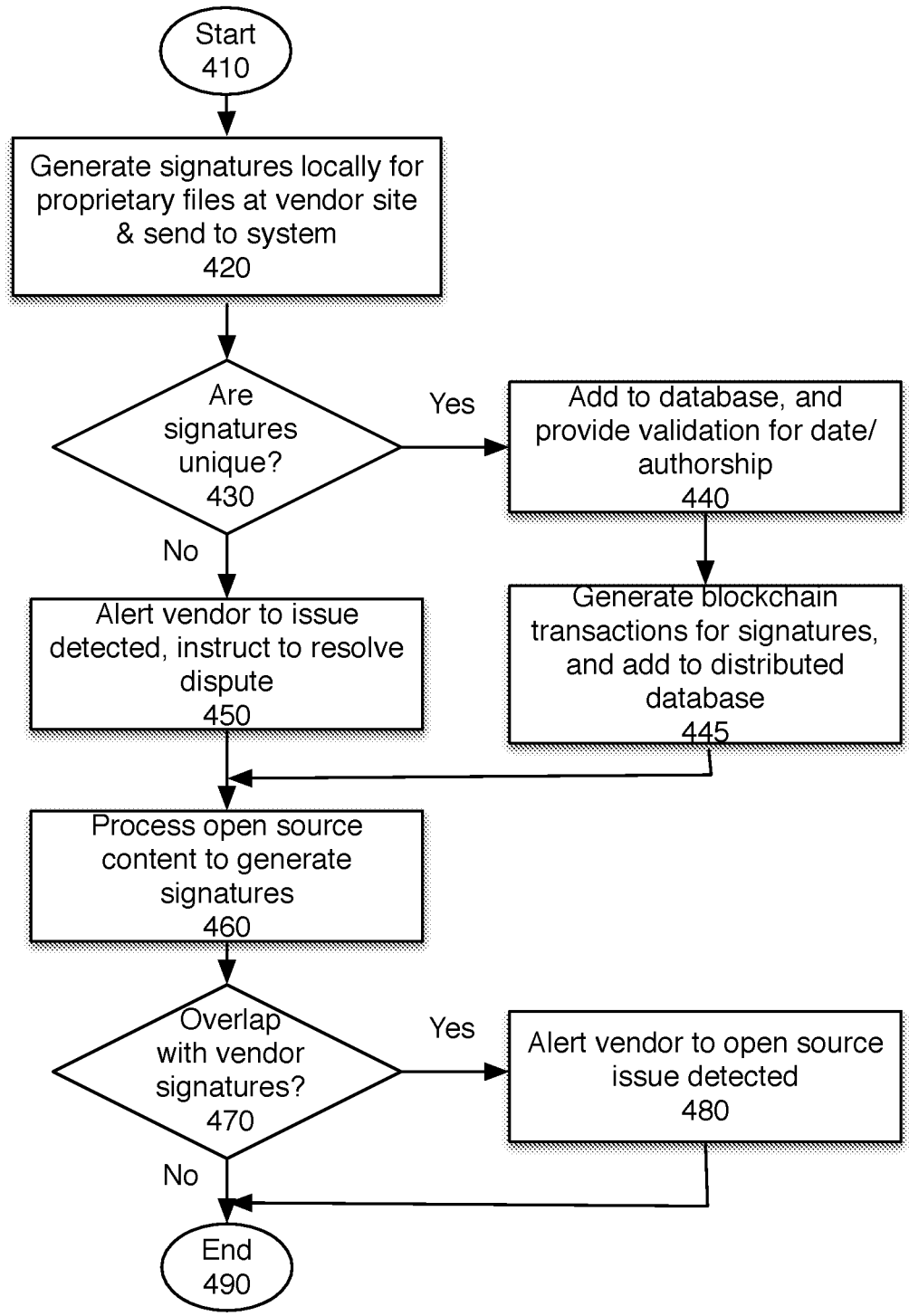
FIG. 4 is an overview flowchart of one embodiment of the system.

FIG. 4 is an overview flowchart of one embodiment of the system. The process starts at block 410. At block 420, signatures are generated locally for proprietary files. In one embodiment, the proprietary files may be hardware description language, such as HDL files. The signatures are generated, in one embodiment, using the process described below.

At block 430, the system determines whether the signatures are unique. This ensures that the system can uniquely identify the file segment associated with the signature. Note that the signature generation algorithm is such that the signatures are unique. Therefore, if the signature is not unique, that means that the same code was submitted multiple times to signature generation. If the signatures are unique, they are added to a database at block 440. In one embodiment, in addition to the signature, the relevant metadata is also added to the database. The metadata may include information about the vendor, license, and other relevant information.

At block 445, a blockchain transaction is generated for each of the validated signatures, and the transactions are recorded to the blockchain that acts as a distributed database. The distributed database makes the signature available. This enables the use of the signature for authentication, proof of authorship, ownership, and existence. In one embodiment, this enables the distributed database to become a central 'registrar' for authenticity of the proprietary files. In one embodiment, the blockchain acts as a sort of 'escrow' in validation that does not require users to store their proprietary files. This is cheaper to manage than traditional escrow services. In one embodiment submissions to blockchain are securely signed to identify submitting organization, and associated metadata to support trail of ownership, licensing, and other metadata.

The process then continues to block 460. If the signature was not unique, at block 450 the vendor is alerted to the policy violation, and directed to resolve it. In one embodiment, such issues may be resolved by identifying licensed content, acquisitions, or other reasons for overlap.

At block 460, the system processes open source content to generate signatures. In one embodiment, the system scrapes multiple repositories of open source data. In one embodiment, the system scrapes data from appropriate type(s) of repositories. For example, there may be repositories of hardware description language (HDL), which may be processed for a system which evaluates HDL. One example of an open source hardware repository is OpenCores found at http://opencores.org/.

At block 470, the process determines whether there are any overlaps. Overlaps may be evidence of open source data contaminating a vendor's product, or the vendor's proprietary code being leaked into open source. If overlap is detected, at block 480 the vendor is alerted to the policy violation, and the open source issue detected. The process then ends, at block 490. In one embodiment, this process runs continuously as new data is acquired from vendors and/or open source repositories. In one embodiment, as versions are released and updated, the process is again run. In one embodiment, the process is only run on newly added content.

Of course, though this is shown as a flowchart, in one embodiment it may be implemented as an interrupt-driven system, or executed over multiple devices and in multiple time frames. For example, signature uniqueness verification may occur periodically, and at a remote system from the system which generates the signatures. Similarly, open source processing may occur in parallel with other processes. Therefore, one of skill in the art should understand this flowchart, and all other flowcharts in this application to describe a set of actions that are related to a particular process, but not assume the ordering of the elements of the flowchart cannot be altered while staying within the scope of the disclosure.

Figure 5:
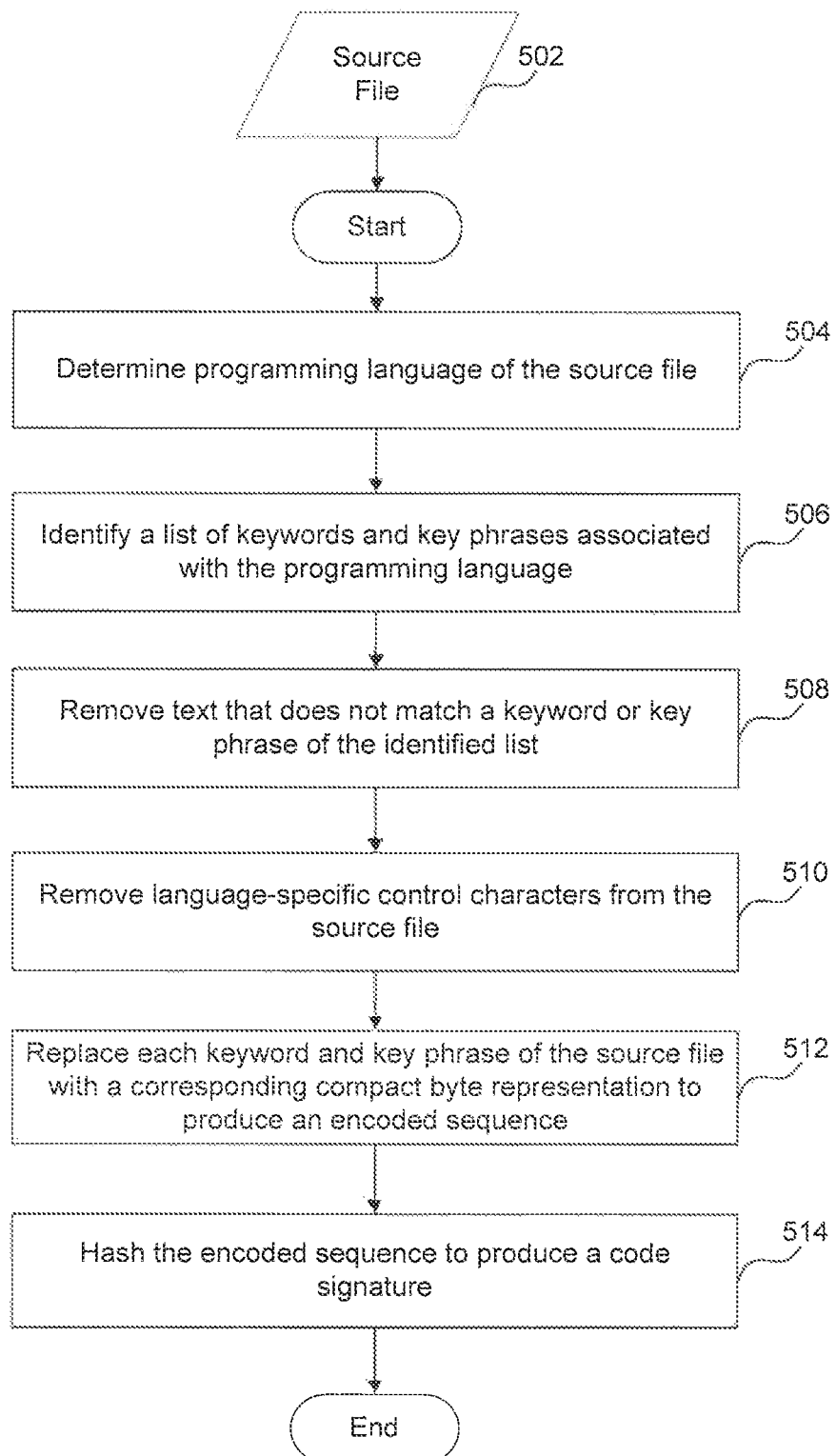
FIG. 5 is a flowchart of one embodiment of generating signatures. (Taken from 2841US01)

FIG. 5 is a flowchart of one embodiment of generating a code signature for a source file. The process begins at stage 504 by determining a language of the source file. In an embodiment, the language may be detected based on the file extension. For example, the file extension "py" may indicate the Python programming language. In an embodiment, the programming language may also be determined through analysis of the file content. For example, presence of 'magic numbers,' unique language-specific reserved keywords, or aspects of the code structure, such as text sequences or indentation may be compared to known aspects associated with the language.

In other instances, hardware components may be described by hardware description language at a level of abstraction that does not include HDL code. For example, the file may be a netlist file in ASCII text or EDIF (Electronic Design Interchange Format) which is a vendor-neutral format commonly used to store electronic netlists and schematics data. The file may also be in a GDSII file in the GDSII stream format, which is a database file format that is a de facto industry standard for data exchange of an integrated circuit or IC layout. It is a binary file format representing planar geometric shapes, text labels, and other information about the layout in hierarchical form. The file may also be in the form of a scripting language or interpretive code for use in a run-time environment that automates the execution of tasks to create a software or hardware build. For simplicity, all of these formats will be referred to as a "language" or "code" and the file that is being analyzed will be referred to as the source file.

At stage 506, a list of reserved keywords, key phrases, and magic numbers associated with the language is identified. For example, terms such as "break" and "return" are language reserved keywords in the C programming language.

In an embodiment, the list of language reserved keywords and key phrases may be stored and maintained in a reference database.

At stage 508, text that does not match a language reserved keyword or key phrase of the identified list is removed from the source file. This removes variable names, comments, and other such parts of the code.

At stage 510, language-specific control characters and control character sequences are removed from the source file. This leaves only language reserved keywords and key phrases, in the processed file. The removal of content from the source file that does not match language reserved keywords or key phrases addresses issues associated with, for example, variable, class, and function name changes within the source file, as the code signature no longer relies on naming conventions.

At stage 512, in one embodiment, each language reserved keyword and key phrase of the source file is replaced with a corresponding compact byte representation to produce an encoded sequence. In an embodiment, each language reserved keyword and key phrase may be mapped to a byte representation, for example a single ASCII character. These mappings may be predefined or defined dynamically. This drastically reduces the size of the encoded sequence for storage and processing. One of skill in the art will appreciate that the corresponding compact byte representations need not be exactly one byte in size, but will typically be smaller in size than the corresponding language reserved keywords and key phrases. Stage 512 may be repeated for individual modules within the source file to create additional code sequences for those individual modules. Individual modules in a source file may be, for example, classes, functions, subroutines, or blocks of a predetermined number of lines of code. In this manner, creation of code sequences for individual modules may then represent code snippets within a source file.

At stage 514, the encoded sequences are hashed to produce code signatures for the source file including, in an embodiment, code signatures for individual modules of the source file. Any available hash function may be used for this purpose, such as but not limited to, MD5, SHA1, SHA2, RIPEMD, or Whirlpool.

The system stores, and utilizes the data from stage 514 and stage 512, for matching. If only signature from stage 514 is stored, then partial matching will be more difficult. In one embodiment, the signature from stage 514 helps pick full matches quickly, and the system can spend more computing time on partial matching that is allowed by the signatures in stage 512.

Figure 6:
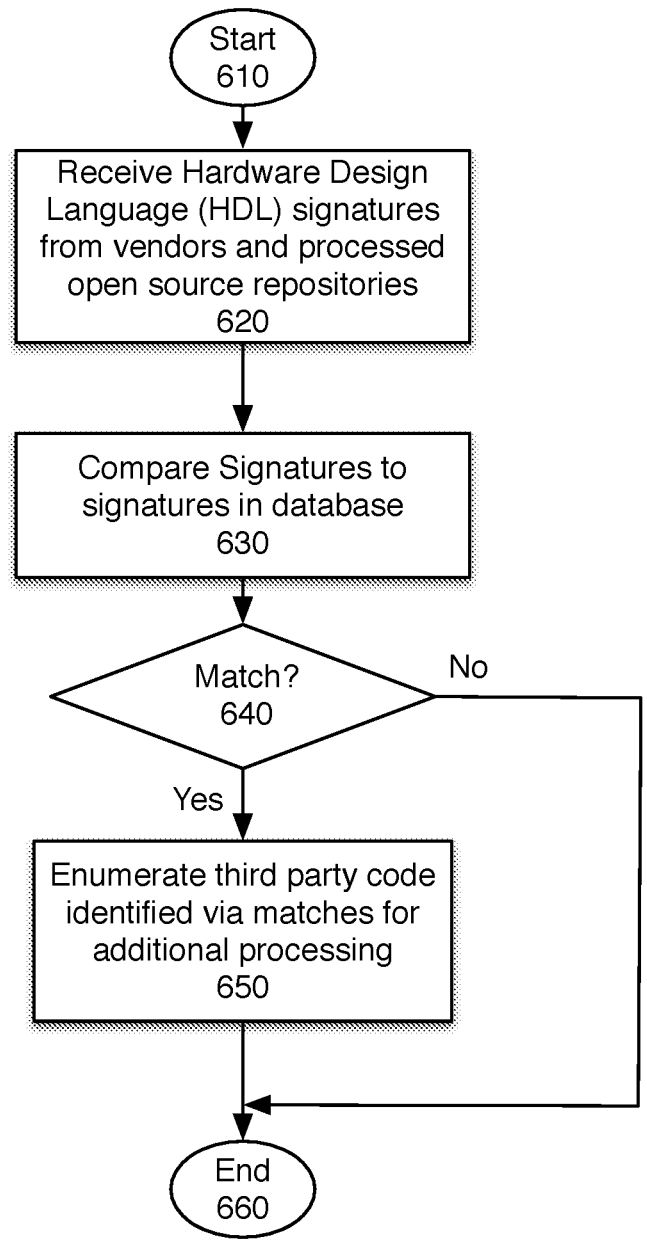
FIG. 6 is a flowchart of one embodiment of enumerating matched signatures. The process starts at block 610.

FIG. 6 is a flowchart of one embodiment of enumerating matched signatures. The process starts at block 610.

At block 620, hardware design language (HDL) or other hardware file signatures are received from vendors and open source repositories or other public sources. The signatures are validated signatures from vendors and signatures from open source repositories.

At block 630, the process compares the signatures to the signatures in the database. The system may include multiple databases. In one embodiment, open source signatures may be in a separate database from vendor signatures.

At block 640, the process determines whether there is a match. If no matches are found, the process ends at block 660.

If there is a match, at block 650, third party identified via matches are enumerated. The enumeration indicates vendor or open source matches, and the sources of those matches. In one embodiment, the set of potential matches are further processed, as will be described below. In one embodiment, the vendor is simply alerted about each match.

Figure 7:
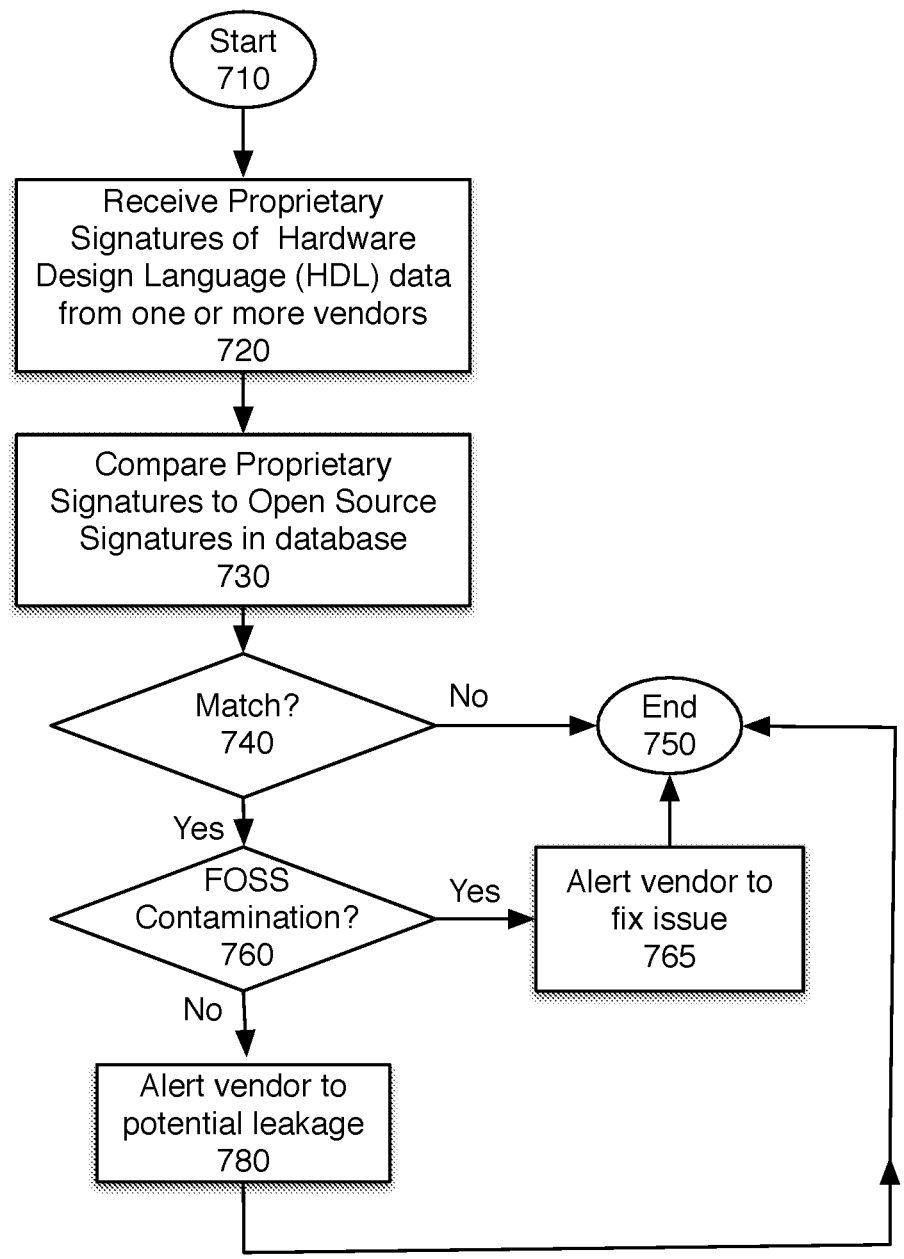
FIG. 7 is a flowchart of one embodiment of verifying proprietary data against open source.

FIG. 7 is a flowchart of one embodiment of verifying HDL data against open source databases. The process starts at block 710.

At block 720 proprietary signatures are received from one or more vendors. The signatures, as previously noted are generated by the vendors.

At block 730, the process compares the proprietary signatures to an open source signatures in the database.

At block 740, the process determines whether there is a match between the open source file, and a proprietary signature. If there is no match, the process ends, at block 750.

If there is a match, the process determines whether this is free or open source software (FOSS) contamination. FOSS contamination occurs when a vendor inadvertently brings open source software into their proprietary files. FOSS contamination occurs when engineers bring in code that is open sourced.

If FOSS contamination is detected, the vendor is alerted to fix the issue, at block 765. If it's not FOSS contamination, then it is likely to be potential leakage. Leakage occurs when proprietary code is made available under an open source license, without the permission of the vendor. At block 780, the vendor is alerted to the potential leakage. The process then ends.

In one embodiment, the determination between leakage and contamination may not be possible to make. If the data about the origination of either the open source or the proprietary files is not fully available, the system may simply alert the vendor of a problem, without specifying whether it was potential leakage or potential contamination.

Figure 8:
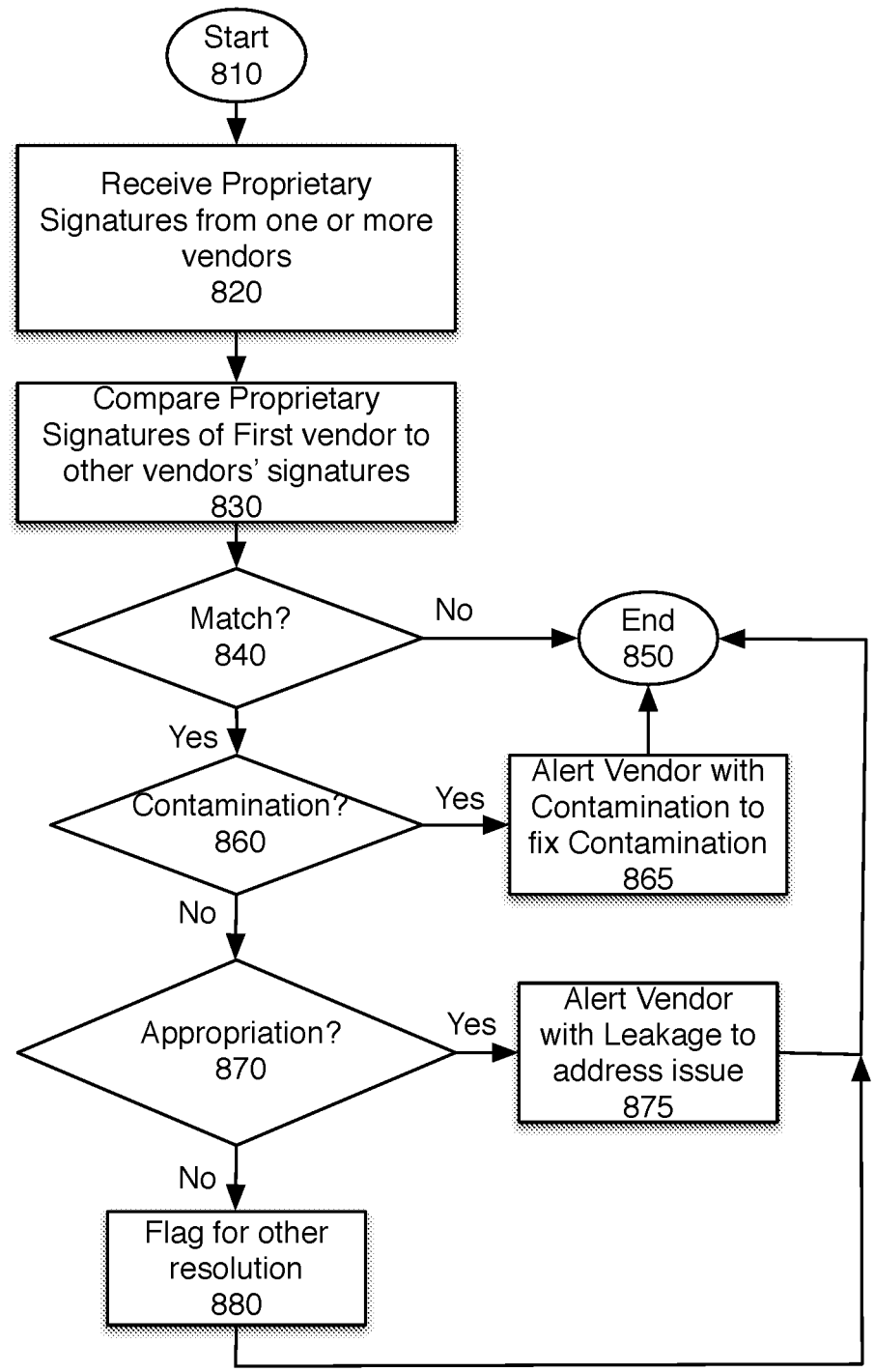
FIG. 8 is a flowchart of one embodiment of verifying proprietary data against other proprietary data.

FIG. 8 is a flowchart of one embodiment of verifying HDL or other IC design data files against the files of other vendors. The process starts at block 810.

At block 820 proprietary signatures are received from one or more vendors. The signatures, as previously noted are generated by the vendors.

At block 830, the process compares the proprietary signatures of a first vendor against proprietary signatures of other vendors. In one embodiment, comparisons are one way.

At block 840, the process determines whether there is a match between the first vendor's proprietary files, and the proprietary signatures of another vendor. If there is no match, the process ends. If there is no match, the process ends at block 850.

If there is a match, the process determines whether this is contamination, at block 860. Contamination occurs when a vendor inadvertently brings another vendor's software into their proprietary files. This may happen as engineers move between vendors, through misappropriation, or otherwise.

If contamination is detected, the vendor is alerted to fix the issue, at block 865. If it's not contamination, then it is likely to be appropriation. Appropriation occurs when proprietary code is taken by another vendor, without a license or similar permission. At block 875, the vendor is alerted to the potential appropriation. If it's not that, or the process cannot identify whether it is contamination or appropriation, then at block 880 the process flags the issue for resolution. The process then ends.

Figure 9:
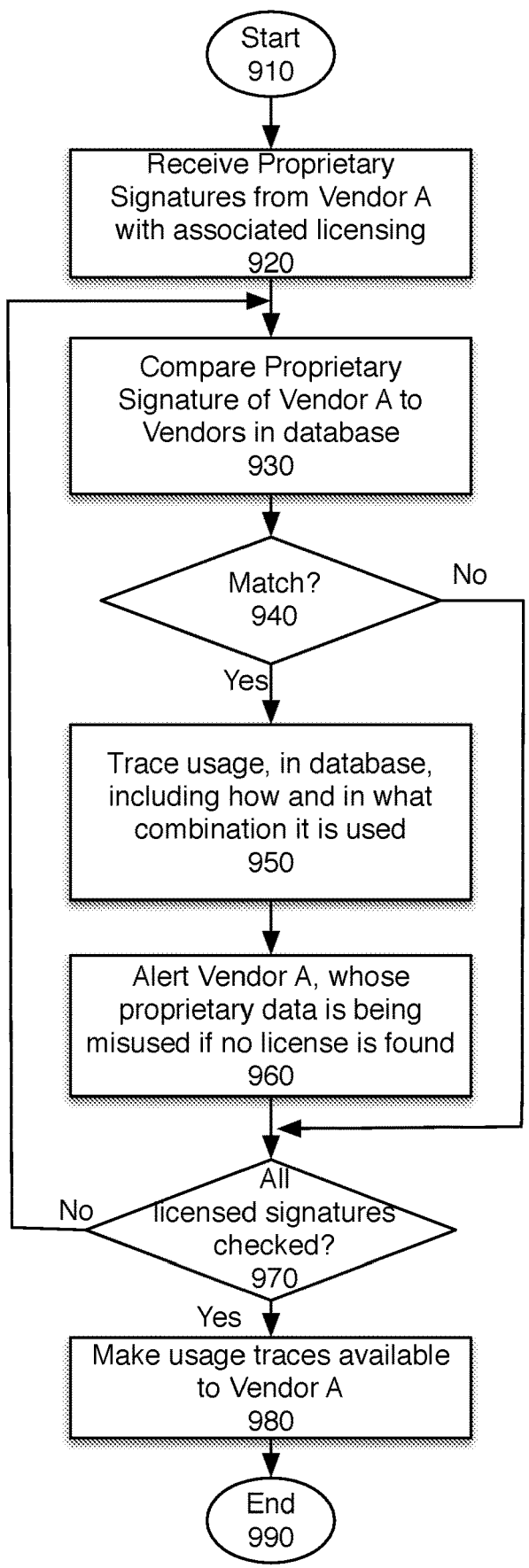
FIG. 9 is a flowchart of one embodiment of licensing and authentication using the system.

FIG. 9 is a flowchart of one embodiment of licensing and authentication using the system. The process starts at block 910. At block 920, proprietary signatures are received from Vendor A along with licensing data. In one embodiment, the licensing data may include the types of licenses available. In one embodiment, the licensing data may be tied to a database of licensed companies.

At block 930, the proprietary signatures from vendor A's licensed portfolio are compared to the code portfolios of other vendors.

At block 940, the process determines whether there is a match. If no match is found, the process continues directly to block 970, to determine whether all signatures have been checked. If not, the process returns to block 930, to check the next signature against all vendors in the database. If all signatures have been checked, at block 980 a usage trace is created for each signature. The usage trace identifies the travel of the code. It also permits Vendor A to identify unlicensed users. The process then ends at block 990.

If a match was found at 950, the usage is traced in the database. The usage data may include how and in what combination (e.g. combined with what other content) the code is used.

At block 960, vendor A may be alerted if no license data is used.

At block 970, the process determines whether all licensed signatures have been checked. If not, the process returns to block 930, to check the next signature. If all signatures have been checked, at block 980 the usage trace data is made available to the vendor A. In one embodiment, the usage traces may be analyzed by the system to determine licensees, and enable the creation of a list of licensees as well. The process ends at block 990.

Figure 10:
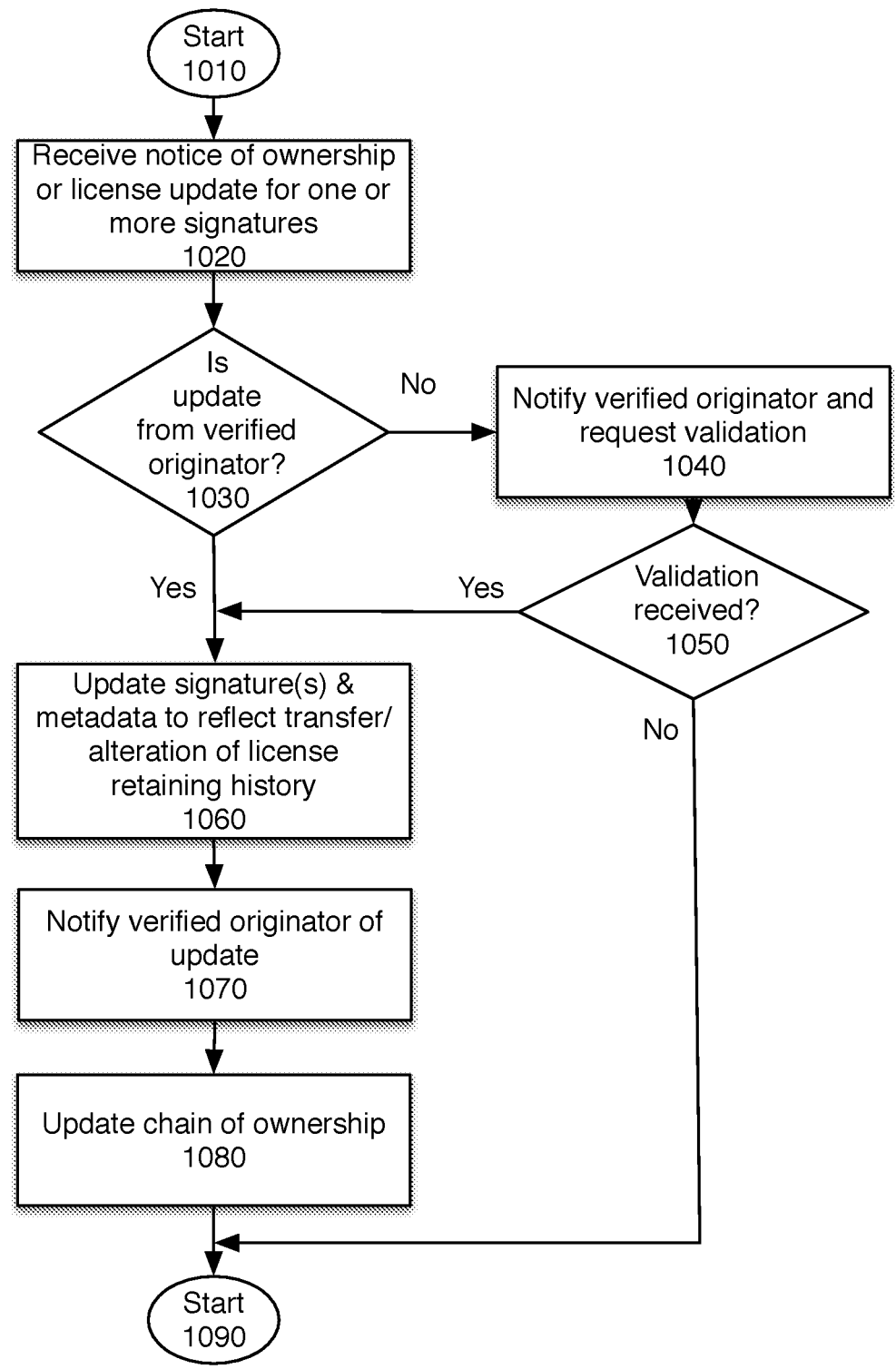
FIG. 10 is a flowchart of one embodiment of updating data in an existing signature.

FIG. 10 is a flowchart of one embodiment of updating data in an existing signature. In one embodiment, as files are deprecated, or licenses are altered, software is sold or acquired. The system maintains the signatures in the databases, but updates the metadata to reflect the current status. The process starts at block 1010.

At block 1020, a notice of update of some proprietary files that have signatures is received. At block 1030, the process determines whether the update is from the verified originator. The verified originator is the same entity that originally provided the signatures. In one embodiment, public key cryptography is used to provide verification.

If the update is not from the verified originator, the verified originator is notified, and validation is received. If no validation is received, at block 1050, the process ends. If validation is received, the process continues to block 1060. If the update is verified, as determined at block 1030, the process continues to block 1060.

At block 1060, the signature and/or metadata is updated to reflect the transfer, change of license, or other status change. In one embodiments, the history of prior statuses and ownerships is maintained. At block 1070, the verified originator is notified of the update. This ensures that there cannot be an update by a third party, without the originator's consent. At block 1080, the chain of ownership is updated. The process then ends at block 1090.

Figure 11:
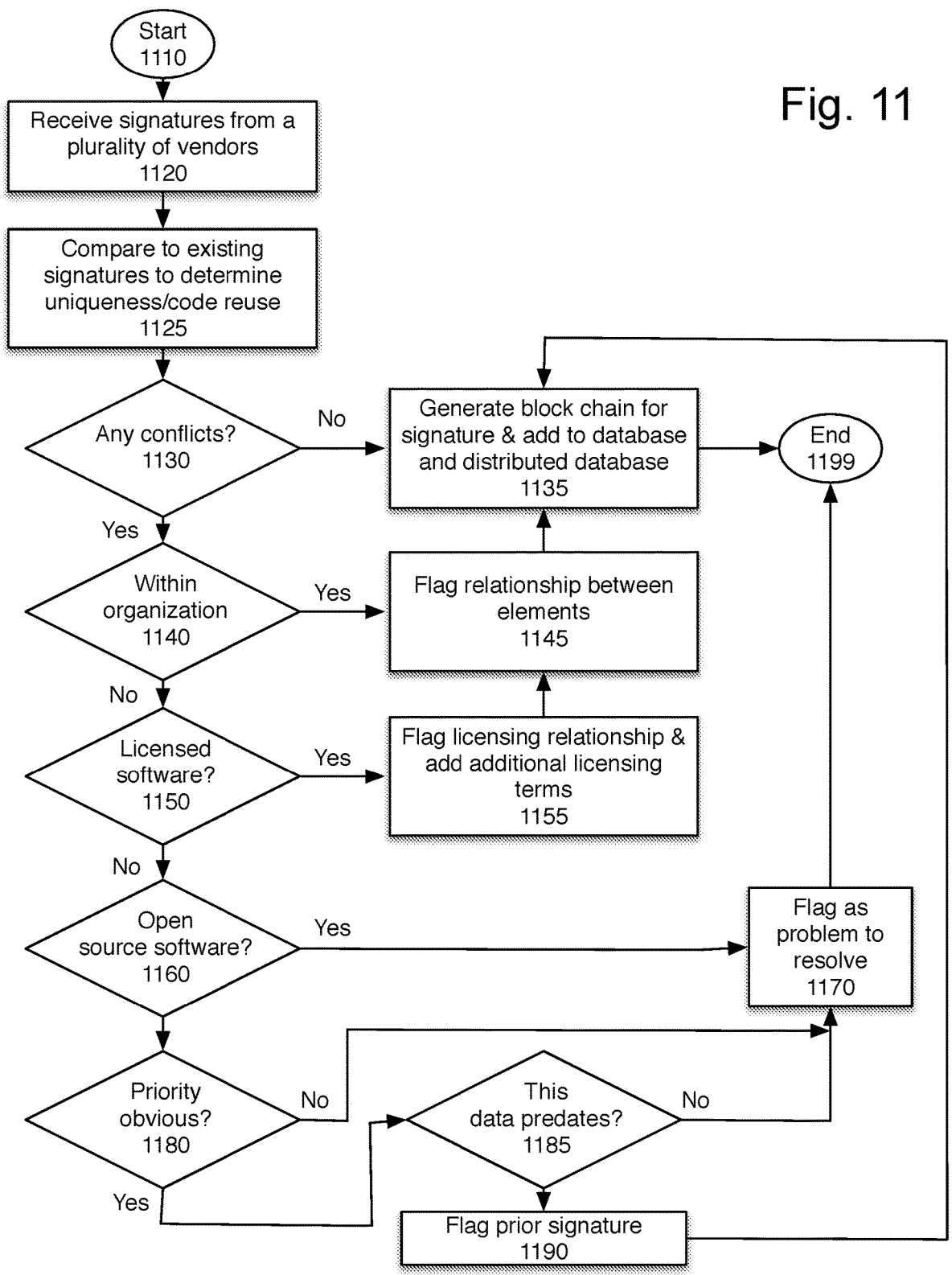
FIG. 11 is a flowchart of one embodiment of resolving conflicts.

FIG. 11 is a flowchart of one embodiment of resolving conflicts. The process starts at block 1110.

At block 1120, a plurality of signatures from a plurality of vendors are received and placed in a database.

At block 1225, new signatures are compared to existing signatures, to determine uniqueness. In one embodiment, because of the way signatures are generated, duplication inherently means that the code is substantially identical.

If no conflicts are found, at block 1130, at block 1135, a blockchain is generated for the signature, and it is added to the database and distributed database. The process then ends at block 1199.

If there is a conflict, found at block 1130, the process continues to block 1140. At block 1140, the process determines whether the conflict is within the organization. Proprietary code is often reused within an organization in new projects. If the reuse is within the organization, the relationship between the elements is flagged, at block 1145. In one embodiment, the blockchain is generated only once for each signature. However, because the metadata stores the relationship of the reuse, this is sufficient.

If the conflict is not within the organization, as determined at block 1140, at block 1150, the process determines whether this is licensed software. If so, at block 1155, the process flags the licensing relationship and adds the additional licensing terms. As a general rule, if the original signature submission includes the licensing term (e.g. that the code segment is not proprietary to the vendor but rather licensed) this check may not indicate a conflict with the licensor. However, if the original signature submission does not make this indication, the data is added at block 1155. The relationship is then flagged, at block 1145.

If the software is not licensed software, as determined at block 1150, the process determines whether the data is open source software. If so, the system flags the code segment, at block 1170. The process then ends at block 1199.

If the conflict is not with open source, the process continues to block 1180. At block 1180, the process determines whether the priority is obvious. Priority indicates when the code was originally created, and can show that the later-added code is actually the code that should be in the system. If the priority is not obvious, the process flags this conflict as a problem to resolve, at block 1170.

If the priority is obvious, at block 1185, the process determines whether this data predates the existing data in the system. If so, the prior signature is flagged, at block 1190. In one embodiment, the prior vendor is alerted, as well as the new vendor. If this data does not predate, then the conflict is flagged as a problem to resolve.

The embodiments of FIG. 11 may be utilized to resolve legal proceedings when allegations arise or to identify instances of overuse of licensed hardware or software components. Overuse may occur, by way of example, when an organization licenses a circuit block for a limited number of uses but inadvertently uses the circuit block in a number of circuits that exceeds the authorized licensed limit. In such cases, resolution may be for the licensee to submit additional payment to the licensor for such overuse and to amend the license agreement to reflect such use. In other instances, a foundry business may require vendors to submit to a review prior to manufacture of an integrated circuit for a third party vendor to prevent (or at least eliminate) piracy.

Figure 12:
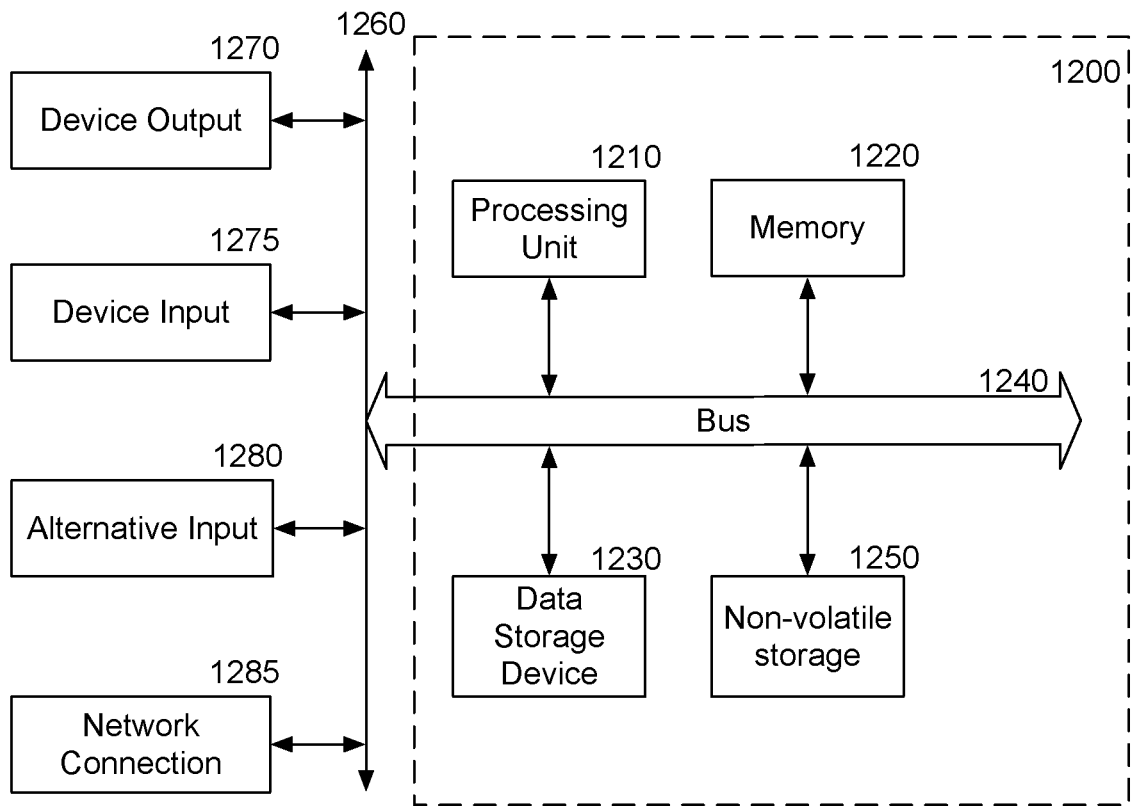
FIG. 12 is a block diagram of a computer system which may be used with the present system.

FIG. 12 is a block diagram of one embodiment of a computer system. The computer system may be a desktop computer, a server, or part of a distributed set of computers, or "cloud" system which provides processing and storage capabilities. The elements described above with respect to FIG. 3 are implemented by one or more computer systems, which may correspond to the computer system described herein. It will be apparent to those of ordinary skill in the art, however that other alternative systems of various system architectures may also be used.

The system illustrated in FIG. 12 includes a bus or other internal communication means 1240 for communicating information, and a processing unit 1210 coupled to the bus 1240 for processing information. The processing unit 1210 may be a central processing unit (CPU), a digital signal processor (DSP), or another type of processing unit 1210.

The system further includes, in one embodiment, a random access memory (RAM) or other volatile storage device 1220 (referred to as memory), coupled to bus 1240 for storing information and instructions to be executed by processor 1210. Main memory 1220 may also be used for storing temporary variables or other intermediate information during execution of instructions by processing unit 1210.

The system also comprises in one embodiment a read only memory (ROM) 1250 and/or static storage device 1250 coupled to bus 1240 for storing static information and instructions for processor 1210. In one embodiment, the system also includes a data storage device 1230 such as a magnetic disk or optical disk and its corresponding disk drive, or Flash memory or other storage which is capable of storing data when no power is supplied to the system. Data storage device 1230 in one embodiment is coupled to bus 1240 for storing information and instructions.

The system may further be coupled to an output device 1270, such as a cathode ray tube (CRT) or a liquid crystal display (LCD) coupled to bus 1240 through bus 1260 for outputting information. The output device 1270 may be a visual output device, an audio output device, and/or tactile output device (e.g. vibrations, etc.)

An input device 1275 may be coupled to the bus 1260. The input device 1275 may be an alphanumeric input device, such as a keyboard including alphanumeric and other keys, for enabling a user to communicate information and command selections to processing unit 1210. An additional user input device 1280 may further be included. One such user input device 1280 is cursor control device 1280, such as a mouse, a trackball, stylus, cursor direction keys, or touch screen, may be coupled to bus 1240 through bus 1260 for communicating direction information and command selections to processing unit 1210, and for controlling movement on display device 1270.

Another device, which may optionally be coupled to computer system 1200, is a network device 1285 for accessing other nodes of a distributed system via a network. The communication device 1285 may include any of a number of commercially available networking peripheral devices such as those used for coupling to an Ethernet, token ring, Internet, or wide area network, personal area network, wireless network or other method of accessing other devices. The communication device 1285 may further be a null-modem connection, or any other mechanism that provides connectivity between the computer system 1200 and the outside world.

Note that any or all of the components of this system illustrated in FIG. 12 and associated hardware may be used in various embodiments of the present system.

It will be appreciated by those of ordinary skill in the art that the particular machine that embodies the present system may be configured in various ways according to the particular implementation. The control logic or software implementing the present system can be stored in main memory 1220, mass storage device 1230, or other storage medium locally or remotely accessible to processor 1210.

It will be apparent to those of ordinary skill in the art that the system, method, and process described herein can be implemented as software stored in main memory 1220 or read only memory 1250 and executed by processor 1210. This control logic or software may also be resident on an article of manufacture comprising a computer readable medium having computer readable program code embodied therein and being readable by the mass storage device 1230 and for causing the processor 1210 to operate in accordance with the methods and teachings herein.

The present system may also be embodied in a handheld or portable device containing a subset of the computer hardware components described above. For example, the handheld device may be configured to contain only the bus 1240, the processor 1210, and memory 1250 and/or 1220.

The handheld device may be configured to include a set of buttons or input signaling components with which a user may select from a set of available options. These could be considered input device #1 1275 or input device #2 1280. The handheld device may also be configured to include an output device 1270 such as a liquid crystal display (LCD) or display element matrix for displaying information to a user of the handheld device. Conventional methods may be used to implement such a handheld device. The implementation of the present system for such a device would be apparent to one of ordinary skill in the art given the disclosure of the present invention as provided herein.

The present system may also be embodied in a special purpose appliance including a subset of the computer hardware components described above, such as a kiosk or a vehicle. For example, the appliance may include a processing unit 1210, a data storage device 1230, a bus 1240, and memory 1220, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1285.

It will be appreciated by those of ordinary skill in the art that any configuration of the particular machine implemented as the computer system may be used according to the particular implementation. The control logic or software implementing the present system can be stored on any machine-readable medium locally or remotely accessible to processor 1210. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
   receiving one or more proprietary files from a vendor;
   generating, by a signature generator embedded in one or more electronic design automation (EDA) tools, one or more signatures, wherein a signature corresponds to a segment of a proprietary file of the one or more proprietary files, wherein the proprietary file of the one or more proprietary files comprises hardware description language code;
   validating each of the signatures to ensure that the signatures are owned by the vendor;
   comparing a signature of the one or more signatures with existing signatures;
   in response to determining that the signature is not unique and a conflict exists within the vendor based on the comparison, storing a relation between the signature and an existing signature, wherein the relation reflects an ownership relationship between the proprietary file and the vendor;
   identifying, in response to determining that the signature is not unique, at least one of leakage, misappropriation, appropriation, or contamination of the one or more proprietary files with one or more of proprietary files from another vendor, and open source files.

2. The method of claim 1, wherein the proprietary file further comprises a netlist file.

3. The method of claim 1, further comprising:
   utilizing a blockchain code to create a public ledger in a distributed database, to record the signatures.

4. The method of claim 1, further comprising:
   adding the signature to a global database, wherein the global database is used to compare the proprietary data of the vendor to other technology data;
   processing and generating open source content of a repository of HDL; and
   utilizing the global database to identify free and open source software (FOSS) incorporated into the proprietary files of the vendor.

5. The method of claim 1, further comprising:
   utilizing the global database to identify a leakage of the proprietary file or a portion of the proprietary file, the leakage indicating a presence of the proprietary file or the portion of the proprietary file in one of: public domain data, free and open source (FOSS) data, and other vendors' proprietary data.

6. The method of claim 1, further comprising:
   notifying a particular vendor when the signature indicates that one or more submitted proprietary files of the particular vendor are registered to another entity.

7. The method of claim 6, further comprising:
   resolving conflict between one or more signatures and other data in the global database.

8. The method of claim 7, wherein resolving conflict comprises one or more of: identifying co-ownership, identifying licensing, acquisition, and priority.

9. The method of claim 1, further comprising:
   enabling tracking of where the proprietary code is used, based on the signatures; and to alert the vendor when a policy violation is detected.

10. The method of claim 1, further comprising:
    tracking and providing a proof of authorship, and chain of ownership, based on the signatures that are resistant to code modifications and alterations.

11. A technology and ownership validation system comprising:
    a signature generator embedded in one or more electronic design automation (EDA) tools, the signature generator configured to generate one or more signatures corresponding to one or more proprietary files received from a vendor;
    a signature validator configured to receive the one or more signatures, wherein each signature corresponds to a segment of a proprietary file of the one or more proprietary files, wherein the proprietary file of one or more proprietary files comprises hardware description language code, wherein the signature validator is further configured to compare a signature of the one or more signatures with existing signatures and validate each of the signatures to ensure that the signatures are owned by the vendor;

in response to determining that the signature is not unique and a conflict exists within the vendor based on the comparison, storing a relation between the signature and an existing signature, wherein the relation reflects an ownership relationship between the proprietary file and the vendor; and a memory including a global database to store the signatures, the global database used to compare the proprietary files of the vendor to other technology data and identify, in response to determining that the signature is not unique, at least one of leakage, misappropriation, appropriation, or contamination of the one or more proprietary files with one or more of proprietary files from another vendor, and open source files.

12. The system of claim 11, wherein the proprietary file further comprises a netlist file.

13. The system of claim 11, further comprising:
a blockchain generator to create a blockchain transaction for each of the signatures, the blockchain serving as a public ledger of the signatures in a distributed database.

14. The system of claim 11, further comprising:
a signature matcher to identify free and open source software (FOSS) incorporated into the proprietary files of the vendor using the signatures in the global database.

15. The system of claim 11, further comprising:
a signature matcher to identify leakage of the proprietary file, indicating presence of the proprietary files in one of: public domain data, free and open source (FOSS) data, and other vendors' proprietary data.

16. The system of claim 15, further comprising:
an alert system to notify a particular vendor when the signature indicates that one or more submitted proprietary files of the particular vendor are registered to another entity.

17. The system of claim 16:
wherein the signature validator is further configured to resolve conflict between one or more signatures and other data in the global database, by one of: identifying co-ownership, identifying licensing, acquisition, and priority.

18. The system of claim 11, wherein
the global database is used to enable tracking of where the proprietary code is used, based on the signatures; and
wherein the system is further comprising an alert system to alert the vendor when a policy violation is detected.

19. A system to provide technology and ownership validation of files, the system comprising:
a processing device configured to execute:
one or more electronic design automation (EDA) tools available to a vendor as a vendor system configured to enable a vendor to generate unique signatures locally for proprietary files, without disclosing the proprietary files to another, wherein a proprietary file of the one or more proprietary files comprises hardware description language code; and
a signature validator configured to receive the unique signatures from the tool, compare a signature of the plurality of signatures with existing signatures and validate each of the plurality of signatures to ensure that the signatures are owned by the vendor, in response to determining that the signature is not unique and a conflict exists within the vendor based on the comparison, storing a relation between the signature and an existing signature, wherein the relation reflects an ownership relationship between the proprietary file and the vendor; and
a memory coupled to the processing device, the memory comprising a global database to store the unique signatures and metadata, the global database used to identify, in response to determining that the signature is not unique, at least one of leakage, misappropriation, appropriation, or contamination of the proprietary files with one or more of proprietary files from another vendor, and open source files.

20. The system of claim 19, wherein the proprietary file further comprises a netlist file.

* * * * *